United States Patent
Bodagala et al.

(10) Patent No.: US 10,769,149 B2
(45) Date of Patent: Sep. 8, 2020

(54) TRANSITIVE LOCAL PREDICATED ACROSS MULTIPLE JOINS

(71) Applicant: HEWLETT PACKARD ENTERPRISE DEVELOPMENT LP, Houston, TX (US)

(72) Inventors: Sreenath Bodagala, Cambridge, MA (US); James Laurence Finnerty, Cambridge, MA (US)

(73) Assignee: MICRO FOCUS LLC, Santa Clara, CA (US)

( * ) Notice: Subject to any disclaimer, the term of this patent is extended or adjusted under 35 U.S.C. 154(b) by 510 days.

(21) Appl. No.: 15/033,519

(22) PCT Filed: Dec. 6, 2013

(86) PCT No.: PCT/US2013/073687
§ 371 (c)(1),
(2) Date: Apr. 29, 2016

(87) PCT Pub. No.: WO2015/084407
PCT Pub. Date: Jun. 11, 2015

(65) Prior Publication Data
US 2016/0283552 A1  Sep. 29, 2016

(51) Int. Cl.
*G06F 16/2453* (2019.01)
*G06F 16/2455* (2019.01)

(52) U.S. Cl.
CPC .... *G06F 16/24544* (2019.01); *G06F 16/2453* (2019.01); *G06F 16/2454* (2019.01); *G06F 16/2456* (2019.01)

(58) Field of Classification Search
CPC .......... G06F 17/30442; G06F 17/3046; G06F 17/30466; G06F 17/30498
See application file for complete search history.

(56) References Cited

U.S. PATENT DOCUMENTS

| | | | |
|---|---|---|---|
| 5,412,804 A * | 5/1995 | Krishna | G06F 16/24544 |
| 6,112,198 A * | 8/2000 | Lohman | G06F 17/30445 |
| 6,438,542 B1 * | 8/2002 | Koo | G06F 17/30454 |
| 6,460,043 B1 * | 10/2002 | Tabbara | G06F 16/2452 |
| 6,850,927 B1 * | 2/2005 | Hsu | G06F 16/24542 |
| 6,965,891 B1 | 11/2005 | Jakobsson et al. | |
| 7,181,446 B2 | 2/2007 | Bossman et al. | |
| 7,512,600 B2 | 3/2009 | Al-Omani et al. | |
| 8,200,657 B2 | 6/2012 | Purcell et al. | |

(Continued)

OTHER PUBLICATIONS

International Searching Authority, "Notification of Transmittal of the International Search Report and the Written Opinion", PCT/US2013/073687, dated Sep. 4, 2014, 9 pages.

(Continued)

*Primary Examiner* — Mark D Featherstone
*Assistant Examiner* — Navnett Gmahl

(57) ABSTRACT

In an example, a transitive local predicates may be inferred across multiple joins, wherein the multiple outer joins include multiple outer joins. A query connecting tables by the multiple joins is analyzed. A local predicate may then be identified from the analyzed query and may be determined to be either a where-clause local predicate or an on-clause local predicate. Accordingly, a transitive local predicate may be inferred across a selection of the tables based on the determination.

20 Claims, 3 Drawing Sheets

(56) References Cited

U.S. PATENT DOCUMENTS

| | | | |
|---|---|---|---|
| 8,825,678 B2* | 9/2014 | Potapov | G06F 3/0611 |
| | | | 706/20 |
| 9,026,524 B1* | 5/2015 | Goldman | G06F 17/30466 |
| | | | 707/714 |
| 2002/0198726 A1* | 12/2002 | Kiernan | G06F 17/30466 |
| | | | 705/1.1 |
| 2004/0220904 A1 | 11/2004 | Finlay et al. | |
| 2005/0065926 A1 | 3/2005 | Chen et al. | |
| 2005/0165751 A1 | 7/2005 | Bossman et al. | |
| 2006/0074901 A1* | 4/2006 | Pirahesh | G06F 17/30466 |
| 2006/0129535 A1* | 6/2006 | Purcell | G06F 17/30457 |
| 2006/0161566 A1* | 7/2006 | Dobra | G06F 17/3046 |
| 2006/0218128 A1* | 9/2006 | Muras | G06F 17/30466 |
| 2007/0130115 A1* | 6/2007 | Au | G06F 16/24535 |
| 2007/0192283 A1* | 8/2007 | Larson | G06F 16/2453 |
| 2007/0239691 A1* | 10/2007 | Ordonez | G06F 17/30466 |
| 2009/0100004 A1* | 4/2009 | Andrei | G06F 17/30424 |
| 2011/0184933 A1 | 7/2011 | Colby et al. | |
| 2011/0252073 A1* | 10/2011 | Pauly | G06F 16/13 |
| | | | 707/812 |
| 2012/0047117 A1* | 2/2012 | Nica | G06F 16/24539 |
| | | | 707/702 |
| 2013/0124500 A1* | 5/2013 | Beavin | G06F 16/24534 |
| | | | 707/714 |
| 2013/0311444 A1* | 11/2013 | Samwel | G06F 16/245 |
| | | | 707/714 |
| 2014/0095520 A1* | 4/2014 | Ziauddin | G06F 16/24557 |
| | | | 707/756 |

OTHER PUBLICATIONS iSERIES Information Center, "Joint Optimization", Version 5 Release 3, (Web Page), Retrieved Nov. 26, 2013, 13 Pages, http://publib.boulder.ibm.com/infocenter/iseries/v5ra/index.jsp?topic=%2Frzajq%2Fperf24.htrn.

Quanzhong Li et al., "Adaptively Reordering Joins During Query Execution", In: IEEE 23rd International Conference on Data Engineering, ICDE 2007, See pp. 30-32.

Walrath, D., Sybase Adaptive Server IQ Version 12.0, (Research Paper), Nov. 8, 2013, 66 Pages.

Arun Swami et al., "On the Estimation of Join Result Sizes", Proceedings of the International Conference on Extending Database Technology, Mar. 1994, 15 pages.

* cited by examiner

200

```
┌─────────────────────────────────────────────────────┐
│ ANALYZE A QUERY INCLUDING TABLES CONNECTED BY JOINS,│
│ WHEREIN THE JOINS INCLUDE AT LEAST A PLURALITY OF   │
│                      OUTER JOINS                    │
│                        210                          │
└─────────────────────────────────────────────────────┘
                         │
                         ▼
┌─────────────────────────────────────────────────────┐
│         IDENTIFY A LOCAL PREDICATE FROM THE QUERY   │
│                        220                          │
└─────────────────────────────────────────────────────┘
                         │
                         ▼
┌─────────────────────────────────────────────────────┐
│ DETERMINE WHETHER THE LOCAL PREDICATE IS A WHERE-   │
│ CLAUSE LOCAL PREDICATE OR AN ON-CLAUSE LOCAL        │
│ PREDICATE                                           │
│                        230                          │
└─────────────────────────────────────────────────────┘
                         │
                         ▼
┌─────────────────────────────────────────────────────┐
│ INFER A TRANSITIVE LOCAL PREDICATE ACROSS A         │
│ SELECTION OF THE TABLES BASED ON THE DETERMINATION  │
│                        240                          │
└─────────────────────────────────────────────────────┘
```

FIG. 2

TRANSITIVE LOCAL PREDICATED ACROSS MULTIPLE JOINS

BACKGROUND

A relational database includes a collection of tables of data items formally described and organized according to the relational model for database management. The relational model is based on first-order predicate logic, whereby the data items are represented in terms of tuples grouped into relations. Often, data items from multiple tables are combined using a join operation. Using a relational database management system (RDBMS), users and programs may request data from a relational database by performing a query that is written in a special language, usually a dialect of the Structured Query Language (SQL). After receiving the query, the RDBMS may rewrite or transform predicates in the query to optimize a search for the requested data items.

BRIEF DESCRIPTION OF THE DRAWINGS

Features of the present disclosure are illustrated by way of example and not limited in the following figure(s), in which like numerals indicate like elements, in which:

FIG. 2 shows a flow diagram of a method to infer a transitive local predicate across multiple joins, according to an example of the present disclosure.

DETAILED DESCRIPTION

Figure 1:
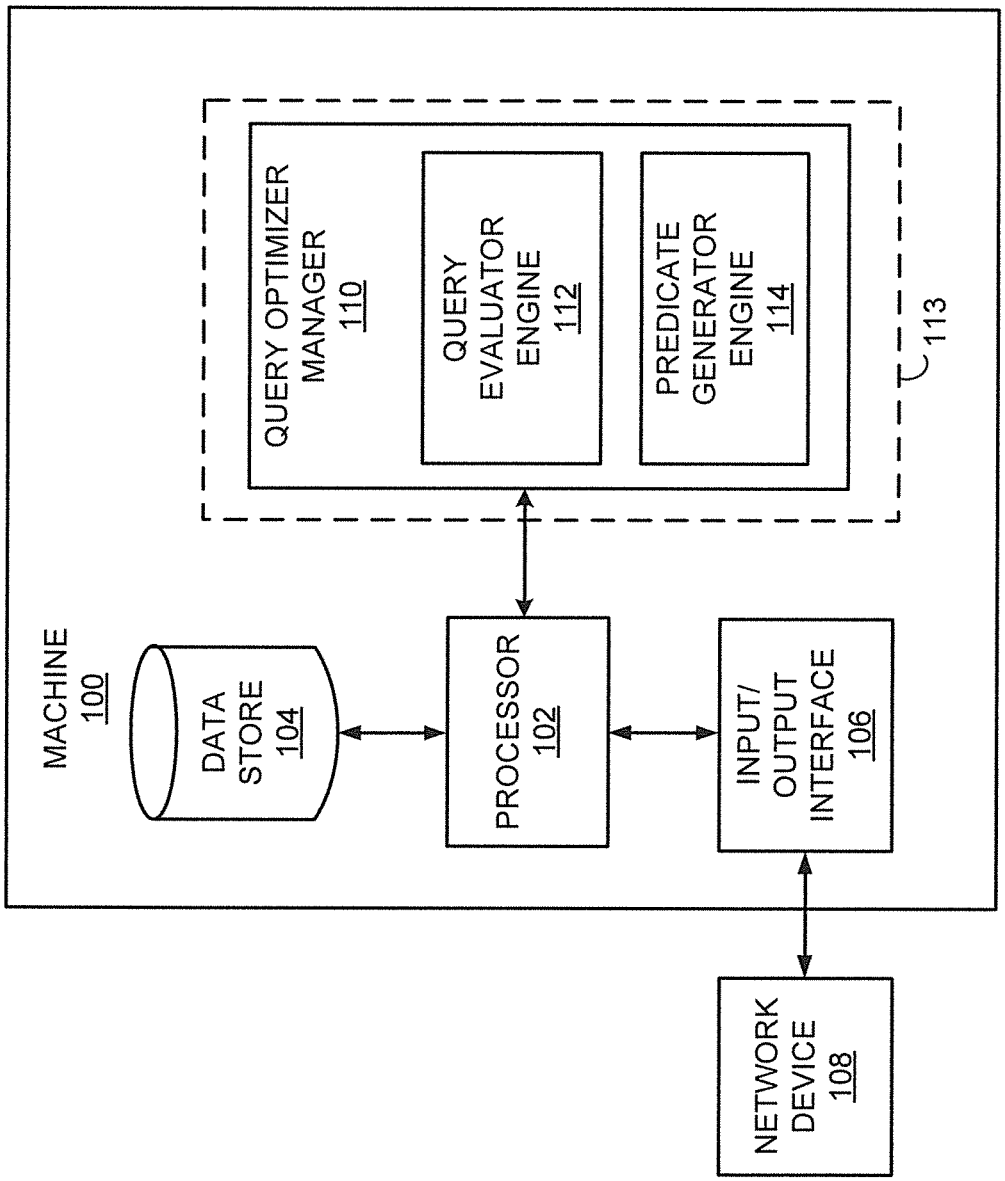
FIG. 1 shows a block diagram of a machine that may implement an inference of a transitive local predicate across multiple joins, according to an example of the present disclosure.

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Disclosed herein are examples of a method to infer transitive local predicates across a multiple joins. Also disclosed herein is a system for implementing the methods and a non-transitory computer readable medium on which is stored machine readable instructions that implement the methods. Methods to infer transitive local predicates across multiple joins may be implemented or invoked in a Vertica™ column-stored database or other types of databases.

According to a disclosed example, a query may be analyzed to identify a local predicate and to determine whether the local predicate is a where-clause local predicate or an on-clause local predicate. The query may, for instance, include tables connected by multiple joins. Specifically, the multiple joins may include multiple outer joins according to an example. Based on the determination of whether the local predicate is a where-clause local predicate or an on-clause local predicate, a transitive local predicate may be inferred across a selection of the tables to improve query performance.

For example, in response to a determination that the local predicate is a where-clause local predicate, the transitive local predicate may be inferred across all the tables connected by the joins if the where-clause local predicate is a strong local predicate and all join predicates are equality join predicates. Thus, the selection of tables whereby the transitive local predicate may be inferred includes all the tables from the query.

In response to a determination that the local predicate is an on-clause local predicate, a local table that is associated with the on-clause local predicate may be identified. A determination may then be made as to whether a table from the query is connected to the local table by a left outer join or an inner join. Responsive to the table being connected to the local table by a left outer join or an inner join, then a transitive local predicate may be inferred to the table if the on-clause local predicate is a strong local predicate and all the join predicates are equality join predicates. Further, the transitive local predicate may be inferred across each table that is connected to the local table by a sequence of left outer joins and/or an inner joins.

Query performance of database systems may be improved by inferring transitive local predicates in the context of multiple joins (i.e., left outer joins, right outer joins, full outer joins, and/or inner joins) according to the disclosed examples. Specifically, the benefits of an improved and more efficient query performance may be derived from inferring transitive local predicates prior to performing the join operations as disclosed in the examples herein.

Definitions of selected terms employed in the present disclosure are listed below. The definitions include various examples that fall within the scope of a term and that may be used for implementation. The examples are not intended to be limiting. Both singular and plural forms of terms may be within the definitions.

A predicate may include a condition in a query that can be used to limit the rows returned. Local Predicate: A local predicate refers to a predicate that involves only a single table. For example, given the following scenario:

Tables: A (a int); B (b int);
SQL: select * from A, B where A.a=B.b and A.a=1;
A.a=1 is a local predicate.

Strong Local Predicate: A strong local predicate is a local predicate that does not evaluate to true on NULL values of predicate columns. In the example above, A.a=1 is a strong local predicate because it does not evaluate to true for rows having NULL values for the column A.a. On the other hand, if the local predicate was formulated as A.a=1 or A.a is Null, than A.a is not a strong predicate because it evaluates to true for rows with NULL values for the column A.a.

Where-Clause Local Predicate: A where-clause local predicate refers to a local predicate that appears in the where-clause of a SQL statement. In the example above, for instance, A.a=1 is a where-clause local predicate.

On-Clause Local Predicate: An on-clause local predicate refers to a local predicate that appears in the on-clause of a SQL statement. For example, given the following scenario:

SQL: select * from A left outer join B on (A.a=B.b and A.a=1);
A.a=1 is an on-clause local predicate.

Join Predicate: A join predicate refers to a predicate that involves two or more tables. For example, given the following scenario:

SQL: select * from A, B where A.a=B.b and A.a=1;
A.a=B.b is a join predicate.

Transitive Predicate: A transitive predicate is a predicate implied based on the transitive closure property. For example, given the following scenario:

Table: A (a int); B (b int); C (c int);
SQL: select * from A, B, C where A.a=B.b and B.b=C.c;
A.a=C.c is an implied transitive predicate.

Transitive Local Predicate: A transitive local predicate refers to a local predicate that is implied from a join predicate and another local predicate. For example, given the following scenario:

Tables: A (a int); B (b int);
SQL: select * from A, B where A.a=B.b and A.a=1;
B.b=1 is a transitive local predicate.

With reference to FIG. 1, there is shown a block diagram of a machine 100 that may implement an inference of transitive local predicates across a multiple joins according to an example of the present disclosure. It should be understood that the machine 100 may include additional components and that one or more of the components described herein may be removed and/or modified without departing from a scope of the machine 100.

The machine 100 is depicted as including a processor 102, a data store 104, an input/output interface 106, and a query optimization manager 110. The machine 100 may be a computer. In one example, the computer is a server but other types of computers may be used. Also, the components of the machine 100 are shown on a single computer as an example and in other examples the components may exist on multiple computers. The machine 100 may store a flexible schema table in the data store 104 and/or may manage the storage of data in a flexible schema table stored in a separate machine, for instance, through a network device 108, which may comprise, for instance, a router, a switch, a hub, etc. The data store 104 includes a storage device, such as hard disk, memory, etc.

The query optimization manager 110 is depicted as including a query evaluator engine 112 and a predicate generator engine 114. The processor 102, which may comprise a microprocessor, a micro-controller, an application specific integrated circuit (ASIC), or the like, is to perform various processing functions in the machine 100. The processing functions may include the functions of the engines 112 and 114 of the query optimization manager 110 as discussed in greater detail herein below.

In one example, the query optimization manager 110 comprises machine readable instructions stored on a non-transitory computer readable medium 113 and executed by the processor 102. Examples of the non-transitory computer readable medium include dynamic random access memory (DRAM), electrically erasable programmable read-only memory (EEPROM), magnetoresistive random access memory (MRAM), Memristor, flash memory, hard drive, and the like. The computer readable medium 113 may be included in the data store 104 or may be a separate storage device. In another example, the query optimization manager 110 comprises a hardware device, such as a circuit or multiple circuits arranged on a board. In this example, the engines 112 and 114 comprise circuit components or individual circuits, such as an embedded system or ASIC.

The input/output interface 106 comprises a hardware and/or a software interface. The input/output interface 106 may be a network interface connected to a network, such as the Internet, an intranet, etc., through the network device 108, over which the query optimization manager 110 may receive and communicate information, for instance, information regarding a query. The processor 102 may store information received through the input/output interface 106 in the data store 104 and may use the information in implementing the engines 112 and 114. The data store 104 may include volatile and/or non-volatile data storage.

The engines 112 and 114 of the query optimization manager 110 perform an inference of transitive local predicates across a multiple joins as described herein. The functions of the query evaluator engine 112 and the predicate generator engine 114 are discussed in greater detail with respect to methods 200 and 300 in FIGS. 2 and 3.

Figure 3:
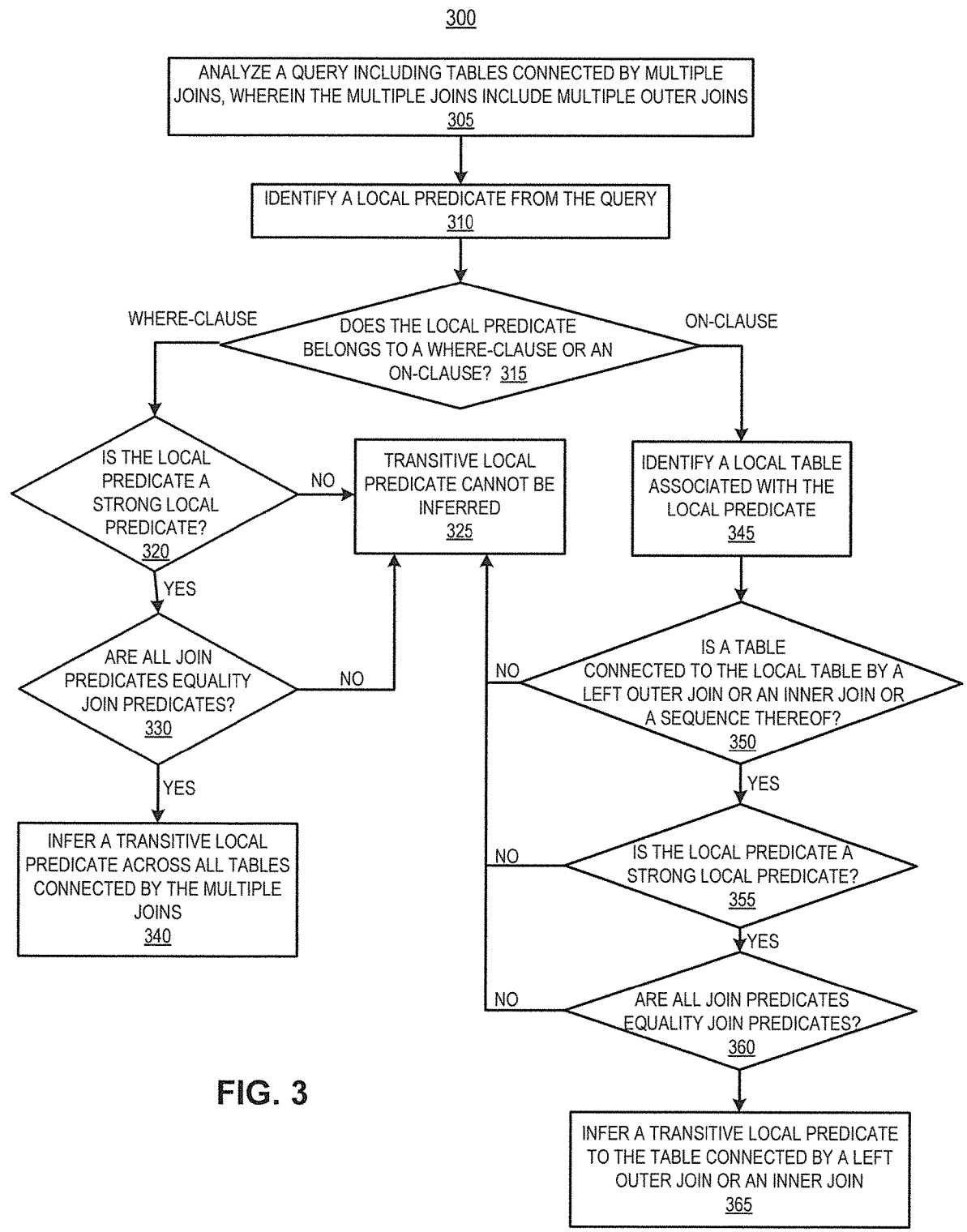
FIG. 3 shows a flow diagram of a method to infer a transitive local predicate across multiple joins, according to a further example of the present disclosure.

FIGS. 2 and 3 respectively depict flow diagrams of methods 200 and 300 for inferring transitive local predicates across a multiple joins according to examples of the present disclosure. It should be apparent to those of ordinary skill in the art that the methods 200 and 300 represent generalized illustrations and that other operations may be added or existing operations may be removed, modified or rearranged without departing from the scopes of the methods 200 and 300. The method 300 is related to the method 200 in that method 300 includes operations in addition to those included in the method 200. Thus, the method 300 may be construed as including all of the features discussed with respect to the method 200.

With reference to FIG. 2, there is shown a flow diagram of the method 200 for inferring transitive local predicates across a multiple joins, according to an example of the present disclosure. The method 200 may be implemented, for instance, by the processor 102 of machine 100 as depicted in FIG. 1.

In FIG. 2, the query evaluator engine 112, for instance, may analyze a query including tables connected by multiple joins, wherein the multiple joins include multiple outer joins as shown in block 210. The query may be an SQL query according to an example.

In addition to the tables and the multiple joins, the query may also include a local predicate and a join predicate for instance. As discussed in the definitions above, the local predicate may be a strong local predicate if it does not evaluate to true on NULL values of predicate columns. Furthermore, according to an example, the local predicate may be a where-clause local predicate or an on-clause local predicate depending on its appearance in the former or latter clause in the query. The local predicate may include, but is not limited to, one or more Boolean operators and/or comparison operators. In contrast, according to an example, the join predicate may include only an equality join operator.

The multiple joins in the query may include at least one of a left outer join, a right outer join, a full outer join, and an inner join. That is, according to an example, the multiple joins may include a combination of outer joins and inner joins, so long as at least one of the multiple joins are outer joins. For example, in SQL, a join can combine records from two or more tables in a database. The combined records may be saved as a table or used as is. A join is an operation for combining fields from two tables by using values common to each. ANSI-standard SQL specifies different types of join, which include a left outer join, a right outer join, a full outer join, and an inner join. For example, joins may be described in the standard for SQL language; ISO/IEC 9075.

At block 220, the query evaluator engine 112, for instance, may identify a local predicate from the query. A predicate from the query may be identified by the query evaluator engine 112 as a local predicate if the predicate involves only one table. The local predicate may be identified by the query evaluator engine 112 that searches an output of a parser according to an example. For instance, the parser may convert the SQL query into an internal representation such as a "parse tree" and the local predicate may be identified by searching the parse tree.

At block 230, the query evaluator engine 112, for instance, may determine whether the local predicate is a where-clause local predicate or an on-clause local predicate. For example, the query evaluator engine 112 may determine whether the local predicate belongs to a where-clause or to an on-clause in the query. The where-clause local predicate and the on-clause predicate may be identified by the query evaluator engine 112 that searches the outputted parse tree.

At block 240, based on the determination in block 230, the predicate generator engine 114, for instance, may infer a transitive local predicate across a selection of the tables from the query. That is, each table on which a transitive local predicate may be inferred may obtain its own transitive local predicate. For example, given the following scenario:

select * from (Foo left outer join Bar on Foo.a=Bar.c) right outer join Pio on (Bar.c=Pio.d) where Foo.a=1.

According to this example, transitive local predicates may be inferred on tables Bar and Pio and the inferred predicates may be Bar.c=1 and Pio.d=1. The selection of the tables where a transitive local predicate may be inferred is discussed in detail in the method 300 in FIG. 3.

With reference to FIG. 3, there is shown a flow diagram of the method 300 for inferring transitive local predicates across a multiple joins, according to a further example of the present disclosure. The method 300 may be implemented, for instance, by the processor 102 of machine 100 as depicted in FIG. 1.

At block 305, a query connecting tables by multiple joins may be analyzed by the query evaluator engine 112, as discussed above with respect to block 210 in FIG. 2. According to an example, the multiple joins may include multiple outer joins.

At block 310, a local predicate is identified from the query by the query evaluator engine 112, for instance, in a manner similar to that discussed above with respect to block 220 in FIG. 2. In addition, at block 315, the query evaluator engine 112 may determine whether the local predicate belongs to a where-clause or an on-clause local in the query, for instance, in a manner similar to that discussed above with respect to block 230.

In response to determining that the local predicate is a where-clause local predicate at block 315, the query evaluator engine 112, for instance, may determine whether the local predicate is a strong local predicate as shown in block 320. For example, the query evaluator engine 112 may determine if the local predicate does not evaluate to true on NULL values of the predicate columns. If the query evaluator engine 112 determines that the local predicate is not a strong local predicate, then the predicate generator engine 114 may not infer a transitive local predicate for the tables in the query as shown in block 325. On the other hand, if the query evaluator engine 112 determines that the local predicate is a strong local predicate, then the method 300 may advance to block 330.

At block 330, the query evaluator engine 112, for instance, may determine whether all the join predicates in the query are equality join predicates. For example, the query evaluator engine 112 may determine whether all the join predicates in the query are of the form table.column=table.column. If the query evaluator engine 112 determines that all of the join predicates are equality join predicates, then the predicate generator engine 114, for instance, may infer a transitive local predicate across all tables connected by the multiple joins as shown in block 340. Otherwise, if the query evaluator engine 112 determines that not all of the join predicates are equality join predicates, then the predicate generator engine 114 may not infer a transitive local predicate for the tables in the query as shown in block 325.

In response to determining that the local predicate is an on-clause local predicate at block 315, the query evaluator engine 112, for instance, may identify a local table that is associated with the local predicate as shown in block 345. Based on the identified local table, the query evaluator engine 112 may determine whether there is a table from the query that is connected to the local table by a left outer join or an inner join as shown in block 350. If the query evaluator engine 112 determines that there is not another table connected to the local table by a left outer join or an inner join, then the predicate generator engine 114 may not infer a transitive local predicate for the another table in the query as shown in block 325. However, if the query evaluator engine 112 determines that there is a table connected to the local table by a left outer join or an inner join, then the method 300 may advance to block 355.

At block 355, the query evaluator engine 112, for instance, may determine whether the local predicate is a strong local predicate. If the query evaluator engine 112 determines that the local predicate is not a strong local predicate, then the predicate generator engine 114 may not infer a transitive local predicate for the another table as shown in block 325. On the other hand, if the query evaluator engine 112 determines that the local predicate is a strong local predicate, then the method 300 may advance to block 360.

At block 360, the query evaluator engine 112, for instance, may determine whether all the join predicates in the query are equality join predicates. If the query evaluator engine 112 determines that all of the join predicates are equality join predicates, then the predicate generator engine 114, for instance, may infer a transitive local predicate to the another table, which is connected to the local table by a left outer join or an inner join as shown in block 365. Otherwise, if the query evaluator engine 112 determines that not all of the join predicates are equality join predicates, then the predicate generator engine 114 may not infer a transitive local predicate for the table as shown in block 325.

According to an example, the query evaluator engine 112 may determine each table from the tables that is connected to the local table by a sequence of joins consisting of at least one of a left outer join and an inner join. Thus, if the local predicate is a strong local predicate and all the join predicates are equality join predicates, then the transitive local predicate may be inferred across each table that is connected to the local table by the sequence of joins. In contrast, the transitive local predicate may not be inferred if a right outer join or full outer join appears anywhere in the join sequence between a local table A and another table B based on the on-clause predicate of A, on B.

The method 300 is discussed in further detail using the following example scenario:

Tables: A (a int); B (b int); C (c int); D (d int);

SQL: select * from (((A left outer join B on A.a=B.b and A.a=1) left outer join C on (B.b=C.c)) right outer join D on (C.c=D.d)).

The SQL query, as shown above, may be analyzed by the query evaluator engine 112 as shown in block 305. In this example, table A is connected to table B by a left outer join, table B is connected to table C by a left outer join and table C is connected to D by a right outer join. The query evaluator engine 112 may identify A.a=1 as a local predicate, which involves only one table as shown in block 310.

At block 315, the query evaluator engine 112 may determine that the local predicate A.a=1 belongs to an on-clause of the SQL query. Accordingly, since table A is associated with the local predicate A.a=1, table A may be identified as the local table by the query evaluator engine 112, as shown in block 345.

The query evaluator engine 112 may then determine that table B is connected to local table A by a left outer join at block 350, that the local predicate A.a=1 is a strong predicate at block 355, and that all the join predicates are equality join predicates at block 360. Therefore, as shown at block 365, a transitive local predicate C.c=1 may be inferred on table C because table A is connected to table B by a left outer join and table B is connected to table C by another left outer join. However, a transitive local predicate may not be inferred on table D because table A is connected to table D by a left outer join (to table B), by another left outer join (to table C) and a right outer join. Thus, the join sequence does not consist of only a combination of left outer joins and/or inner joins.

According to the disclosed examples, a transitive local predicates may be inferred across multiple joins, wherein the multiple joins include multiple outer joins. A query including tables connected by the multiple joins is analyzed. A local predicate may then be identified from the query and may be determined to be either a where-clause local predicate or an on-clause local predicate. Accordingly, a transitive local predicate may be inferred across a selection of the tables based on the determination. For example, in response to a determination that the local predicate is a where-clause local predicate, the transitive local predicate may be inferred across all the tables connected by the joins if the where-clause local predicate is a strong local predicate and all join predicates are equality join predicates. In response to a determination that the local predicate is an on-clause local predicate, a local table that is associated with the on-clause local predicate may be identified. A determination may then be made as to whether a table from the query is connected to the local table by a left outer join or an inner join. Responsive to the table being connected to the local table by a left outer join or an inner join, then a transitive local predicate may be inferred to the table if the on-clause local predicate is a strong local predicate and all the join predicates are equality join predicates. Further, the transitive local predicate may be inferred across each table that is connected to the local table by a sequence of left outer joins and/or an inner joins.

What has been described and illustrated herein are examples of the disclosure along with some variations. The terms, descriptions and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

What is claimed is:

1. A method to infer transitive local predicates across multiple joins, comprising:
    analyzing a query to a database connecting tables by the multiple joins, wherein the multiple joins include multiple outer joins;
    identifying, utilizing a processor, a local predicate from analyzing the query;
    determining whether the local predicate is a where-clause local predicate or an on-clause local predicate, wherein the where-clause local predicate is a local predicate appearing in a where-clause of a Structured Query Language (SQL) statement and the on-clause local predicate is a local predicate appearing in an on-clause of a SQL statement;
    determining whether the local predicate is a strong local predicate;
    determining whether a plurality of join predicates are equality join predicates;
    inferring a transitive local predicate across a selection of the tables based on the determining whether the local predicate is a where-clause local predicate or an on-clause local predicate, the determining whether the local predicate is a strong local predicate, and the determining whether the plurality of join predicates are equality join predicates; and
    performing, utilizing the transitive local predicate, join operations for the query to the database.

2. The method of claim 1, wherein the inferring of the transitive local predicate across the selection of the tables comprises:
    in response to determining that the local predicate is a where-clause local predicate, inferring the transitive local predicate across all the tables if the where-clause local predicate is a strong local predicate and all join predicates are equality join predicates.

3. The method of claim 1, wherein the inferring of the transitive local predicate across the selection of the tables comprises:
    in response to determining that the local predicate is an on-clause local predicate,
        identifying a local table associated with the on-clause local predicate;
        determining a table from the tables that is connected to the local table by a left outer join or an inner join; and
        inferring a transitive local predicate to the table if the on-clause local predicate is a strong local predicate and all the join predicates are equality join predicates.

4. The method of claim 3, further comprising:
    determining each table from the tables that is connected to the local table by a sequence of joins consisting of at least one of a left outer join and an inner join; and
    inferring the transitive local predicate across each table that is connected to the local table by the sequence of joins if the on-clause local predicate is a strong local predicate and all the join predicates are equality join predicates.

5. The method of claim 1, wherein the multiple joins comprise at least one of a left outer join, a right outer join, a full outer join, and an inner join.

6. The method of claim 1, wherein the local predicate is a strong local predicate that does not evaluate to true on NULL values for a predicate column.

7. The method of claim 1, wherein the local predicate includes at least one of a Boolean operator and a comparison operator.

8. A system to infer transitive local predicates across multiple joins, comprising:
    a query evaluator engine, executed by a processor, to:
        analyze a query connecting tables by the multiple joins, wherein the multiple joins include multiple outer joins,
        identify a local predicate from analyzing the query,
        determine whether the local predicate is a where-clause local predicate or an on-clause local predicate, wherein the where-clause local predicate is a local predicate appearing in a where-clause of a Structured Query Language (SQL) statement and the on-clause local predicate is a local predicate appearing in an on-clause of a SQL statement;

determine whether the local predicate is a strong local predicate; and determine whether a plurality of join predicates are equality join predicates; and a predicate generator engine to infer a transitive local predicate across a selection of the tables based on the determination whether the local predicate is a where-clause local predicate or an on-clause local predicate, the determination whether the local predicate is a strong local predicate, and the determination whether the plurality of join predicates are equality join predicates.

9. The system of claim 8, wherein the predicate generator engine is to, in response to a determination that the local predicate is a where-clause local predicate, infer the transitive local predicate across all the tables if the where-clause local predicate is a strong local predicate and all join predicates are equality join predicates.

10. The system of claim 8, wherein the predicate generator engine is to, in response to a determination that the local predicate is an on-clause local predicate, identify a local table associated with the on-clause local predicate;

determine a table from the tables that is connected to the local table by a left outer join or an inner join; and infer a transitive local predicate to the table if the on-clause local predicate is a strong local predicate and all the join predicates are equality join predicates.

11. The system of claim 10, wherein the predicate generator engine is to:

determine each table from the tables that is connected to the local table by a sequence of joins consisting of at least one of a left outer join and an inner join; and infer the transitive local predicate across each table that is connected to the local table by the sequence of joins if the on-clause local predicate is a strong local predicate and all the join predicates are equality join predicates.

12. A non-transitory computer readable medium including machine readable instructions executable by a processor to:

analyze a query connecting tables by multiple joins, wherein the multiple joins include multiple outer joins;

identify a local predicate from analyzing the query;

determine whether the local predicate is a where-clause local predicate or an on-clause local predicate, wherein the where-clause local predicate is a local predicate appearing in a where-clause of a Structured Query Language (SQL) statement and the on-clause local predicate is a local predicate appearing in an on-clause of the SQL statement;

determine whether the local predicate is a strong local predicate;

determine whether a plurality of join predicates are equality join predicates; and infer a transitive local predicate across a selection of the tables based on the determination whether the local predicate is a where-clause local predicate or an on-clause local predicate, the determination whether the local predicate is a strong local predicate, and the determination whether the plurality of join predicates are equality join predicates; and perform, utilizing the transitive local predicate, join operations relating to the query to the database.

13. The non-transitory computer readable medium of claim 12, wherein the machine readable instructions are executable by the processor to, in response to a determination that the local predicate is a where-clause local predicate, infer the transitive local predicate across all the tables if the where-clause local predicate is a strong local predicate and all join predicates are equality join predicates.

14. The non-transitory computer readable medium of claim 12, wherein the machine readable instructions are executable by the processor to, in response to a determination that the local predicate is an on-clause local predicate, identify a local table associated with the on-clause local predicate;

determine a table from the tables that is connected to the local table by a left outer join or an inner join; and infer a transitive local predicate to the table if the on-clause local predicate is a strong local predicate and all the join predicates are equality join predicates.

15. The non-transitory computer readable medium of claim 14, wherein the machine readable instructions are executable by the processor to:

determine each table from the tables that is connected to the local table by a sequence of joins consisting of at least one of a left outer join and an inner join; and infer the transitive local predicate across each table that is connected to the local table by the sequence of joins if the on-clause local predicate is a strong local predicate and all the join predicates are equality join predicates.

16. The method of claim 1, wherein the identifying includes converting the query into an outputted parse tree.

17. The method of claim 16, wherein the determining whether the local predicate is a where-clause local predicate or an on-clause local predicate includes searching the outputted parse tree.

18. The system of claim 8, wherein to identify the local predicate, the query evaluator engine is to convert the query into an outputted parse tree.

19. The system of claim 18, wherein to determine whether the local predicate is a where-clause local predicate or an on-clause local predicate, the query evaluator engine is to search the outputted parse tree.

20. The non-transitory computer readable medium of claim 12, wherein to identify the local predicate, the machine readable instructions are executable by the processor to convert the query into an outputted parse tree.

* * * * *